US011507904B1

(12) United States Patent
Oleyarsh et al.

(10) Patent No.: US 11,507,904 B1
(45) Date of Patent: Nov. 22, 2022

(54) OPTIMIZING SEGMENT CREATION

(71) Applicant: JetSmarter Inc., Fort Lauderdale, FL (US)

(72) Inventors: Olga Oleyarsh, Fort Lauderdale, FL (US); Alexey Moshkov, Fort Lauderdale, FL (US); Sergey Petrossov, Fort Lauderdale, FL (US)

(73) Assignee: JetSmarter Inc., Fort Lauderdale, FL (US)

(*) Notice: Subject to any disclaimer, the term of this patent is extended or adjusted under 35 U.S.C. 154(b) by 900 days.

(21) Appl. No.: 15/963,950

(22) Filed: Apr. 26, 2018

(51) Int. Cl.
*G06Q 10/06* (2012.01)
*G06Q 50/30* (2012.01)
*G06Q 10/02* (2012.01)

(52) U.S. Cl.
CPC ....... *G06Q 10/06314* (2013.01); *G06Q 10/02* (2013.01); *G06Q 10/06311* (2013.01); *G06Q 50/30* (2013.01)

(58) Field of Classification Search
CPC ............. G06Q 10/06314; G06Q 10/02; G06Q 10/06311; G06Q 50/30; G06Q 10/067; G06Q 10/08355; G06Q 10/06312; G06Q 10/0631; G06Q 10/047; G06Q 10/025; G06Q 10/04
See application file for complete search history.

(56) References Cited

U.S. PATENT DOCUMENTS

| | | | | |
|---|---|---|---|---|
| 5,948,040 A * | 9/1999 | DeLorme | G01C 21/36 | 340/990 |
| 6,813,777 B1 * | 11/2004 | Weinberger | H04B 7/18508 | 348/E5.008 |
| 7,028,304 B1 * | 4/2006 | Weinberger | G06Q 10/10 | 709/227 |
| 8,165,809 B1 * | 4/2012 | Baker | G01C 21/00 | 701/533 |

(Continued)

FOREIGN PATENT DOCUMENTS

| | | | |
|---|---|---|---|
| FR | 2905488 A1 * | 3/2008 | H04L 29/06 |
| FR | 3021108 A1 * | 11/2015 | H04L 67/10 |

(Continued)

OTHER PUBLICATIONS

Compilation of Non-Patent Literature articles and YouTube videos considered; dates ranging 2016 and earlier.*

*Primary Examiner* — Mohamed N El-Bathy
(74) *Attorney, Agent, or Firm* — Fish & Richardson P.C.

(57) ABSTRACT

Methods, systems, and apparatus, including computer programs encoded on a computer storage medium, that enable operators to initiate segments. In one aspect, a method includes providing, to an electronic device of a third party operator, an interface that enables the operator to provide features of a segment that the operator is willing to operate for a segment provider that provides segments for clients. Data specifying the features of the segment is received from the electronic device. A determination that the features of the segment include a departure code, a destination code, a (Continued)

departure date, and a jet for the segment is made. A distribution output is calculated based at least on the features of the segment. An interface is updated to present the distribution output to the third party operator. The segment is created in response to detecting interaction with the interface control that confirms the segment.

18 Claims, 8 Drawing Sheets

(56) References Cited

U.S. PATENT DOCUMENTS 10,490,087 B2 * 11/2019 Dennerline ............ G01C 21/20
2002/0013718 A1 * 1/2002 Cornwell ............. G06Q 20/201 705/5
2003/0135423 A1 * 7/2003 Daum .................. G06Q 10/025 705/5
2003/0139950 A1 * 7/2003 Daum .................... G06Q 10/02 705/5
2004/0030593 A1 * 2/2004 Webster ................. G06Q 10/02 705/13
2004/0225953 A1 * 11/2004 Rank ..................... G06F 40/174 715/234
2004/0267580 A1 * 12/2004 Becker ................... G06Q 10/02 705/5
2006/0020496 A1 * 1/2006 Azzarello .............. G06Q 10/04 705/5
2006/0046718 A1 * 3/2006 Gevalt ................... G06Q 10/00 455/432.3
2007/0244730 A1 * 10/2007 Johnson ................. G06Q 10/02 705/5
2009/0044004 A1 * 2/2009 Wang ...................... G06F 9/451 713/100
2009/0216600 A1 * 8/2009 Hill ........................ G06Q 50/30 705/7.14
2011/0166898 A1 * 7/2011 Zarrow .................. G06Q 10/02 705/5
2012/0209636 A1 * 8/2012 Sloan ..................... G06Q 50/30 705/5
2013/0103437 A1 * 4/2013 Nelson ................... G06Q 10/02 705/6
2013/0226634 A1 * 8/2013 Jackson ............. G06Q 30/0605 705/5
2014/0162598 A1 * 6/2014 Villa-Real ............ G06Q 20/363 455/411
2014/0180732 A1 * 6/2014 Rotchin ............... G06Q 10/083 705/5
2014/0180733 A1 * 6/2014 Rotchin ................. G06Q 10/02 705/5
2016/0012445 A1 * 1/2016 Villa-Real ............ G06Q 20/353 705/44
2016/0203422 A1 * 7/2016 Demarchi ............... G06F 16/29 705/6
2016/0247097 A1 * 8/2016 Jackson ................. G06Q 50/14
2017/0140654 A1 * 5/2017 Dennerline ............ G01C 21/20
2018/0061243 A1 * 3/2018 Shloosh ............... G08G 5/0091
2020/0182637 A1 * 6/2020 Kumar ................... G06Q 50/14

FOREIGN PATENT DOCUMENTS

WO WO-2005081625 A2 * 9/2005 ............. G06Q 10/02
WO WO-2012093618 A1 * 7/2012 ............. G06Q 10/04
WO WO-2017173416 A1 * 10/2017 ........... G08G 5/0021
WO WO-2017173417 A1 * 10/2017 ............. G08G 5/065

* cited by examiner

500

Confirmed Segments

| AIRCRAFT | DATE | ROUTE | OPERATOR ACCEPTED | DISTRIBUTION OUTPUT | |
|---|---|---|---|---|---|
| **A000AA**<br>Lightjet 123 | Wednesday, May 30, 2018<br>7:30 AM – 1:30 PM | KBCT<br>KMMU | Operator A<br>April 25, 2018, 8:21 AM | 10,000 | 510 |
| **B000BB**<br>Heavyjet 321 | Friday, June 1, 2018<br>9:00 AM – 12:30 PM | KBCT<br>KMMU | Operator D<br>April 27, 2018, 12:58 PM | 12,500 | 520 |
| **A000AA**<br>LightJet 321 | Thursday, June 7, 2018<br>11:00 AM – 6:00 PM | KFLL<br>KLFK | Operator B<br>April 27, 2018, 3:18 PM | 9,500 | 530 |

FIG. 5

OPTIMIZING SEGMENT CREATION

BACKGROUND

This specification relates to optimizing segment creation.

Historically, options for traveling between an origin and a destination have been limited to commercial public options in which individual spots (e.g., seats) are acquired by anyone and private options in which all spots in an aircraft or other mode of transport are acquired together by an individual.

SUMMARY

In general, one innovative aspect of the subject matter described in this specification can be embodied in systems that include one or more front-end servers that interact, over a data communication network with electronic devices of third party operators and one or more back-end servers in data communication with the one or more front-end servers. The one or more back-end servers can include one or more data processors. The one or more front-end servers or the one or more back-end servers can be configured to perform operations including providing, to an electronic device of a third party operator, an interface that enables the operator to provide features of a segment that the operator is willing to operate for a segment provider that provides segments for clients; receiving, from the electronic device, data specifying the features of the segment; determining that the features of the segment include a departure code, a destination code, a departure date, and a jet for the segment; calculating, based at least on the features of the segment, a distribution output that the segment provider will provide to the operator for operating the segment and making the segment available for the clients of the segment provider; updating the interface to present the distribution output to the third party operator; detecting, based on data received from the electronic device of the operator, interaction with an interface control that confirms the segment being provided by the operator according to the features of the segment; and creating the segment in response to detecting interaction with the interface control that confirms the segment.

These and other embodiments can each optionally include one or more of the following features. In some aspects, calculating, based at least on the features of the segment, a distribution output for the operator for operating the segment includes determining an hourly rate for the segment based on a duration of time between a current time at which data specifying the features of the segment is received and the departure date; determining, based on the departure code and the destination code, a segment duration for the segment; identifying a number of spots on the segment; and determining the distribution based on a combination of the hourly rate, the segment duration, and the number of spots on the segment.

Some aspects can include triggering navigation of a jet to a geographic location corresponding to the departure code or the destination code. In some aspects, the features of the segment include a time window in which the operator is willing to schedule the segment for departure and creating the segment includes scheduling the segment on the departure date and at a time that is within the time window.

Some aspects can include detecting, based on data received from the electronic device, interaction with an interface control that holds the amount constant for a specified time period and keeping the amount constant for the specified time period.

Some aspects can include notifying multiple different clients that the segment is available and enabling the multiple different clients to claim remaining spots on the segment through a client-side application.

Some aspects can include calculating a required submission for each spot based on the distribution output. Notifying the multiple different clients can include providing data specifying the determined required submission for each spot. Some aspects can include receiving, from a client, a request to claim a spot on the segment and reserving a spot on the segment for the client.

Particular embodiments of the subject matter described in this specification can be implemented so as to realize one or more of the following advantages. A robust computing platform and graphical interfaces described herein enable operators to make available spots for clients of a segment service provider on segments that the operator will operate. The segments can be created by an operator at any time utilizing the interfaces to specify features of the segments. Operators can make available all or only a subset of the spots on a segment, giving the operator increased control of the segment. Similarly, the interfaces allow the operator to specify a departure time window for which the segment will be available to depart, providing flexibility to the segment service provider while also giving the operator control over the scheduling of the segment. Allowing operators to make spots available in this manner can increase the inventory of spots for clients of the segment service provider. This also allows operators to fill spots that would otherwise be empty, increasing the efficiency of the segments.

Interfaces described herein can provide a summary of information and controls that enable an operator to more efficiently obtain data about the operator's segments and confirm those segments. The computing platform can quickly notify many different clients about the availability of spots on newly created segments using push notifications and updates to interfaces that enable clients to view and/or claims spots on segments. The interfaces can also allow clients to efficiently claim a spot on segments by presenting a summary of information about the segment and including code (e.g., an active link) that navigates directly to an interface that enables the client to claim a spot on the segment. The input to the interfaces enable the system to create new segments that can be provided to clients of segment service provider, including the automated creation of a flight plan for the segment.

The input to the interfaces can trigger deployment of a jet to a departure location of the new segment based on a departure time of the segment. The interface can prevent the cancellation of a segment created using the interface after a client has claimed a spot on the segment. Segments created using the interface can result in more efficient utilization of jets by enabling a third party operator to offer spots on a jet that otherwise would have been empty to the clients of the segment service provider. As such, the interface and techniques discussed in this document reduce the amount of wasted resources that may be consumed when moving a jet that otherwise would have been empty or underutilized. This also leads to more efficient use of the limited airspace that is available for jets, for example, by decreasing the number of empty jets that are utilizing that limited airspace.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a screenshot of an example graphical interface that presents segments that an operator has confirmed.

Like reference numbers and designations in the various drawings indicate like elements.

DETAILED DESCRIPTION

Figure 1:
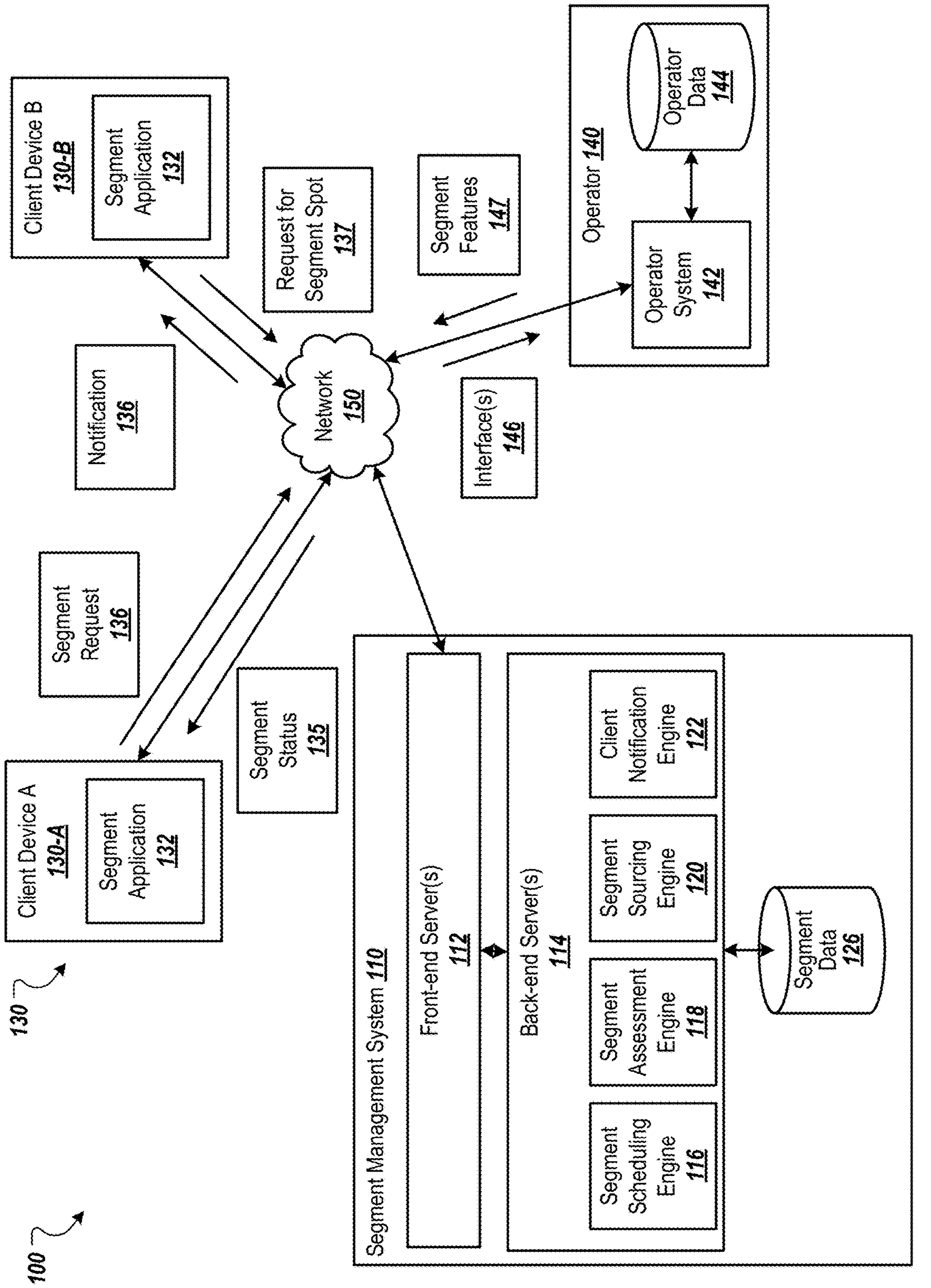
FIG. 1 is a block diagram of an example environment in which a segment management system enables operators to create segments on which multiple different clients can each claim individual spots.

This document describes methods, systems, devices and computer readable medium that facilitate creation of segments based on features provided by third party operators. As used throughout this document, a segment refers to a flight (or other mode of navigation) between an origin and a destination. The term segment refers to any type of flight that carries clients, including shuttles (e.g., a flight between a set of locations specified by the segment provider) and charters (e.g., a flight between two locations freely specified by a client).

A segment service provider (also referred to herein as a segment provider) can provide a segment service (e.g., private jet travel) that allows clients (e.g., a member of the service and/or a user of an application that facilitates creation of the segment) to claim spots on various types of segments. For example, the segment service provider can schedule shuttles along routes. The segment service provider can also allow clients to initiate shuttles along the routes (e.g., with client-specified departure dates and jet types) and to initiate charters between two locations freely specified by a client. Segments initiated by clients can be made available to other clients, for example, by way of a native mobile application (or another appropriate interactive environment, such as a web interface).

A client of the service (rather than the service provider itself) that initiates a segment is referred to herein as a creator. An example creator is a client that initiates (and customizes by specifying features for) a segment (e.g., a flight) over a specified route. A client that claims a spot on a segment is referred to as a finder. A spot refers to a seat or other appropriate area of occupancy for a client on a jet that is used for the segment.

The jets used for the segments can be provided by and/or operated by third party operators different from the segment service provider and different from the clients. An example operator may operate jets as part of a private jet charter business ran by the operator or for other purposes. The operator may also make some jets available for use by the segment service provider and operate these jets, e.g., in response to requests for a jet initiated by the segment service provider.

The segment service provider can also allow operators to initiate segments on which clients of the service can claim a spot. For example, if the operator is planning to fly a jet from an origin to a destination and the spots on the jet would otherwise be empty, the operator can make the jet available to clients of the segment service provider by providing features of the segment to the segment service provider. The segment service provider can then make the segment available to clients of the service.

The segment service provider can provide one or more interfaces that enable operators to specify features (e.g., departure date, origin, destination, and/or jet) of segments. The segment service provider can determine a distribution output for the operator for operating the segment and update an interface to present the distribution output to the operator. The operator can then confirm the segment, e.g., if the operator is satisfied with the amount.

Upon receiving the confirmation, the segment service provider can determine a required submission for each spot on the operator-initiated segment and notify clients of the availability of the segment, e.g., in real time using a robust computing platform that connects the segment service provider with many different clients and many different operators. Clients can then claim a spot on the segment, e.g., by providing the required submission. Enabling operators to make segments available to clients in this manner is an unconventional way of creating segments on which clients can travel that requires new interfaces and the generation of new data.

FIG. 1 is a block diagram of an example environment 100 in which a segment management system 110 enables clients to initiate segments, including private segments and shared segments. The example environment 100 includes a network 150, such as a local area network (LAN), a wide area network (WAN), the Internet, a mobile network, or a combination thereof. The network 150 connects client devices 130 (e.g., client device A 130-A and client device B 130-B) of clients, the segment management system 110, and operator systems 142 of operators 140. The example environment 100 may include many different client devices 130 and operators 140.

The segment management system 110, which can be operated and maintained by the segment service provider, allows clients to arrange transportation on segments provided by the segment service provider. The segment service provider can provide scheduled segments (e.g., scheduled shuttles) between origins and destinations using a client membership model in which clients (e.g., members of the segment service provided by the segment service provider) provide a membership submission to be eligible to claim spots on the segments.

The segment service provider can also enable the clients to initiate segments with custom features (e.g., custom departure date, origin, destination, and/or type of jet). For example, the segment service provider can enable the clients to initiate custom shuttles between locations specified by the segment service provider (e.g., along routes for which the segment service provider provides scheduled segments). The segment service provider can also enable the clients to initiate custom charters (e.g., private and/or shared) between locations freely specified by the client (e.g., along routes that the segment service provider does not provider scheduled segments).

A client can initiate and manage segments, claim a spot on a segment, manage other travel arrangements with the segment management system 110, manage their profile, and/or perform other appropriate tasks related to the segment management system 110 using a client-side segment application 132 executed on the client device 130 of the client. The segment application 132 can transmit data to, and receive data from, the segment management system 110 over the network 150. The segment application 132 can be implemented as a native application developed for a particular platform or a particular device, web browser that provides a web interface, or another appropriate type of application.

The segment application 132 can be executed by the client device 130. The segment application 132 can present and detect user interactions with various interfaces that allow the client to initiate segments, segments, and/or claim a spot on segments.

A client device 130 is an electronic device that is capable of requesting and receiving resources over the network 150. Example client devices 130 include personal computers, mobile communication devices (e.g., Smartphones), tablet devices, and other devices that can send and receive data over the network 150. A client device 130 typically includes a user application, such as a web browser or native application, to facilitate the sending and receiving of data over the network 150. The description that follows refers to a client device that interacts with the segment management system 110 using a native application, but the description that follows is equally applicable to interactions with web pages and/or other web-based resources.

The segment management system 110 includes one or more front-end servers 112 and one or more back-end servers 114. The front-end servers 112 can transmit data to, and receive data from the client devices 130, e.g., client device A 130-A and client device B 130-B, and operator systems 142 of operators 140 over the network 150. For example, the front-end servers 112 can provide, to the segment application 132 of a client device 130 of a client, interfaces or data for presentation with the interfaces. The front-end servers 112 can also receive data specifying interactions with the interfaces of the segment application 132, such as features of a segment initiated by the client. As described in more detail below, the front-end servers 112 can update the interfaces, provide new interfaces, and/or update the data presented by the interfaces based on user interactions with the segment application 132.

As described in more detail below, the front-end servers 112 can also provide interfaces 146 to the operator systems 142 of the operators 140. The interfaces 146 can enable the operators 140 to specify features of segments that the operators are willing to operate for use by clients of the segment service provider. The operator systems 142 can provide data specifying the segment features 147 to the front-end servers 112. Each operator system 142 can include one or more electronic devices, e.g., include personal computers, servers, mobile communication devices tablet devices, and other/or devices that can send and receive data over the network 150. The interfaces 146 can be provided via an application, e.g., a native application developed for a particular platform or a particular device, web browser that provides a web interface, or another appropriate type of application.

The front-end servers 112 can also communicate with the back-end servers 114. For example, the front-end servers 112 can identify data that is to be processed by the back-end servers 114, e.g., data specifying features of a client-initiated segment, and provide the data to the back-end servers 114. The front-end servers 112 can also receive, from the back-end servers 114, data for a particular client and transmit the data to the client device 130 of the particular client over the network 150.

The back-end servers 114 include a segment scheduling engine 116, a segment assessment engine 118, a segment sourcing engine 120, and a client notification engine 122. As used herein, the term engine refers to one or more data processing apparatus that perform a set of tasks. The segment scheduling engine 116 manages the creation, confirmation, and/or cancellation of segments, including segments initiated by clients and segments initiated by operators 140. The segment scheduling engine 116 can receive data specifying features of a segment initiated by a client or operator and create the segment within the segment management system 110. For example, a client that uses a client device A 130-A can interact with interfaces of the segment application 132 to initiate a segment and specify features of the segment. The features can include a departure geographic code (e.g., an origin city name or code, or airport code), a destination geographic code (e.g., a destination city name or code, or airport code), a departure date (which can include a date and/or time) at which the segment will depart from the origin, a type of jet (e.g., light, midsize, heavy, propeller, rotorcraft, etc.), a number of spots being claimed by the client, and/or other appropriate features.

The segment application 132 can generate a segment request 134 and cause the client device A 130-A to transmit the segment request 134 to the segment management system 110 over the network 150. The segment request 134 can include one or more of the client-specified features. In some implementations, the segment request 134 can include all of the features. For example, the application 132 can cause the client device A 130-A to transmit the segment request 134 after all of the appropriate features have been obtained from the client. As described in more detail below, the application 132 can prompt the client for the features using multiple interfaces.

In some implementations, the segment request 134 includes only a portion of the features (e.g., less than all of the features required by the segment service provider). For example, the segment scheduling engine 116 can cause the application 132 to prompt the client for additional features or other information based on initial features received in the conditional segment request 134. In a particular example, the segment request 134 can include the departure geographic code, destination geographic code, and departure date. The segment scheduling engine 116 can receive these features, identify what types of jets are available for travel from the origin to the destination, and provide data specifying the available types of jets to the client device A 130-A for presentation by the application 132 to the client. The client can then select from the available types of jets and the application 132 can cause the client device A to transmit data specifying the selected type of jet to the segment management system 110.

The segment scheduling engine 116 can receive the data and create the appropriate type of segment within the segment management system 110 based on the data and the features received from the client device A 130-A. The segment scheduling engine 116 can also store the data for the created segment in a segment data storage unit 126. The segment data storage unit 126 can include one or more databases (or other appropriate data storage structures) stored in one or more non-transitory data storage media (e.g., hard drive(s), flash memory, etc.).

The segment scheduling engine 116 can also create segments within the segment management system 110 based on data specifying segment features 147 received from operator systems 142 of operators 140. For example, an operator 140 may be flying a jet from an origin to a destination to pick up people at the destination. Rather than fly an empty jet from the origin to the destination, the operator 140 can make the spots (e.g., all or fewer than all of the spots) on the jet available to clients of the segment service provider. In other examples, the operator 140 may make a jet available for the segment service provider rather than let the jet sit idle or for other reasons. The operator 140 can make the spots available to the clients by providing features of the segment (e.g., a departure code for the origin, a destination code for the destination, departure data and/or time, and/or the jet (or type of jet) for the segment) to the segment scheduling engine 116 using one or more interfaces 146.

The segment data storage unit 126 can store data for each segment. For example, the segment data storage unit 126 can store data for each segment scheduled by the segment service provider, each client-initiated segment, and/or each operator-initiated segment. The segment data storage unit 126 can store data for previously operated segments and segments scheduled for operation at a future date.

In some implementations, the stored data can include, for each segment, one or more of a type of aircraft selected for the segment, a departure date and/or time for the segment, geographic codes for the origin and destination of the segment, a number of spots on the segment, a number of spots claimed on the segment, the operator that will provide and/or operate the selected aircraft, a required submission provided by clients to claim a spot on the segment, whether the segment is a scheduled segment that was scheduled by the segment service provider, a client-initiated segment, or an operator-initiated segment, identifiers for each client that claimed a spot on the segment, identifiers for clients (and a number of clients) that actually boarded the segment if the segment has departed, and/or other appropriate data about the segment.

For client-initiated segments, the data can also include an identifier of the client that created the segment, whether the segment is a shuttle or a charter, and/or other appropriate data for client-initiated segments. For operator-initiated segments, the data can also include a distribution output that is provided to the operator for operating the segment, a time window specified by the operator (e.g., a time window in which the operator is willing to have the segment depart), a status of the segment (e.g., locked or confirmed, as described below), and/or other appropriate data for the operator-initiated segment.

The client notification engine 122 can notify clients of segments created in the segment management system 110. For example, the client notification engine 122 can notify clients of segments initiated by operators 140 and/or segments initiated by other clients. In some implementations, clients can view the various segments from an origin to a destination. For example, the segment application 132 can present segments from an origin to a destination using a calendar interface. The calendar interface can include, for each date, zero or more segment indicators for each segment scheduled (or conditional) to travel from the origin to the destination on that date. For example, each segment indicator may be a dot under the date in the calendar. In this example, after the segment is created, a segment indicator will be presented under the departure date for the segment to represent the created segment. If a different client is viewing the calendar interface for flights from the same origin and to the same destination as the created segment, the client can see the dot for the created segment and interact with the dot or the date (e.g., by selecting the dot or the date) to view more information about the created segment and/or claim a spot on the created segment.

In some implementations, the client notification engine 122 notifies clients using push segment notifications 136. For example, the client notification engine 122 can send messages (e.g., within the application 132, via text messaging, and/or via e-mail) to the clients to notify the clients of the created segment. The messages can include code (e.g., an active link) that navigates directly to an application page within the application 132 (or to a web page in a web interface) to claim a spot on the segment. The segment application 132 can present notifications for segments using a dedicated interface. For example, the client can view notifications for segments by navigating to the interface. The notification can cause the client device 130 to present visual information (e.g., information about the segment), generate audio information (e.g., a sound that alerts the client), and/or create a tactile sensation (e.g., a vibration of the client device 130).

In some implementations, the client notification engine 122 transmits the notifications 136 to clients that are likely to be interested in the created segment, e.g., based on previous segments on which the clients were passengers, the location of the clients, and/or frequent locations specified by the clients (e.g., using the application 132).

A client, e.g., the client associated with (e.g., logged into the application 132 on) the client device B 130-B, can request a spot on a client-initiated segment (or operator-initiated segment) using the application 132. For example, the client can interact with a segment indicator for the segment in a calendar interface (e.g., for client-initiated shuttles), select a link in a push notification (e.g., for client-initiated shared charter segments), or another appropriate way. The application 132 can then generate a request for a segment spot 137 and transmit the request for the segment spot 137 to the segment management system 110. The request for the segment spot 137 can include data specifying the client that submitted the request and an identifier of the segment on which the client is requesting a spot.

The segment scheduling engine 116 can receive the request for the segment spot 137 and determine whether there is still a spot available on the segment. For example, there may not be a spot available if other clients have claimed all of the available spots. If there is still a spot available on the segment, the segment scheduling engine 116 can add the client that submitted the request for the segment spot 137 to the segment. If not, the segment scheduling engine 116 can send a notification to the client that the segment is no longer available, e.g., on an interface of the segment application 132.

For client-initiated segments, the segment scheduling engine 116 can provide segment status notifications 135 to the client that created the segment (i.e., the creator) and/or the clients that claimed a spot on the segment. For example, the segment scheduling engine 116 can notify the creator when other clients claim a spot on the shared segment.

The segment assessment engine 118 can determine the total required submission that must be submitted by a creator to create each segment and/or the required submission that clients are required to submit for each spot on a segment. As used throughout this document, the phrase "required submission" refers to any item submitted by a client to claim a spot on a segment. Examples of required submissions include a required amount of money, service provider credit, renewable tokens, or other appropriate items. A different required submission can be specified for each spot on a segment, and the total required submission for a segment can refer to the total amount required by the creator of the segment at the time of segment creation.

The total required submission that must be submitted by the creator and/or the required submission that must be submitted by a client for each spot can be based on various factors, such as the type of jet, the departure and destination geographic codes, the departure date, the duration of time between the time the segment is initiated and the departure date, the type of segment (e.g., shuttle or charter), data stored in the segment data storage unit 126, and/or other appropriate factors.

The segment assessment engine 118 can also determine (e.g., calculate) a distribution output (e.g., an amount of money, credit, or other appropriate item) to provide to an operator for operator-initiated segments. For example, the segment service provider may provide the distribution output (e.g., in the form of a transfer or payment) to the operator upon confirmation of the segment or completion of the segment. The distribution output can be based on the features of the segment provided by the operator, a duration of time between a current time at which data specifying the features of the segment is received by the segment management system 110 and the specified departure date. For example, as described in more detail below, the distribution output can be based on a combination of the duration of time, the number of spots on the segment (e.g., the number of spots that clients of the segment service provider can claim), and a segment duration for the segment (e.g., an estimated flight time or estimated operation time that includes the flight time and taxi time).

The front-end servers 112 can update an interface to present the distribution output to the operator 140 at the operator system 142. The operator 140 can then determine whether to confirm the segment or whether to lock the distribution output for the segment. Locking the segment can lock the distribution output for a specified time period without confirming the segment. The operator can confirm the segment for the same distribution output during the specified time period. Confirming the segment results in creation of the segment and making the segment available for clients of the segment service provider. If the operator 140 confirms the segment (e.g., by interacting with an interface control that enables the operator to confirm the segment), the operator system 142 can transmit, to the front-end servers 112 data specifying the interaction or confirmation. The segment scheduling engine 116 can receive the data from the front-end servers 112 and create the segment in the segment management system 110.

Upon creation of the segment, the segment assessment engine 118 can determine a required submission by clients to claim a spot on the segment and the client notification engine 122 can notify clients about the availability of the segment. The required submission can be based on the distribution output that the operator will be provided for operating the segment and/or the number of spots on the segment that can be claimed by the clients. For example, the required submission for a spot can be directly proportional to the distribution output that the operator will be provided divided by the number of spots on the segment that can be claimed by the clients. In a particular example, the required submission can be equal to the product of a constant factor multiplied by the quotient obtained by dividing the distribution output that the operator will be provided by the number of spots on the segment that can be claimed by the clients. The notification provided by the client notification engine 122 can include data specifying the required submission and code that navigates directly to an application page within the application 132 (or to a web page in a web interface) to claim a spot on the segment, as described above.

In some implementations, the operator 140 can specify a departure time window in which the segment service provider can select a departure time. In this example, the segment scheduling engine 116 (or a person, e.g., a segment scheduler of the segment service provider) can select a departure time for the segment that is within the specified time window.

If the operator 140 locks the distribution output for the segment, the segment scheduling engine 116 can keep the distribution output constant for a specified time period, e.g., four hours, one day, two days, or another appropriate time period. For example, as described above, the distribution output provided to the operator 140 can be based on the duration of time between a current time at which data specifying the features of the segment is received by the segment management system 110 and the specified departure date. The operator 140 can lock the distribution output for the specified time period so that the distribution output does not change based on this duration of time. In turn, the segment service provider can guarantee the locked rate for the operator, e.g., guaranteeing that the operator will received the locked amount if the operator confirms the segment within the specified time period. The operator 140 can later confirm the segment prior to the specified time period lapsing and still receive the same distribution output. If the specified time period elapses, the operator 140 may be required to resubmit the features of the segment and the distribution output may be different based on the features and/or a difference in time between the new current time and the departure date.

The segment management system 110 can prevent changes to operator-initiated segments after the segments are confirmed. For example, the segment scheduling engine 116 may prevent operators 140 from changing the departure and destination codes, departure dates and times, and/or the jet or type of jet that will be used for the segment after the segment is confirmed. In some implementations, the option to adjust these feature can be removed by the segment scheduling engine 116 after confirmation of the segment is completed. In this way, the segment management system 110 ensures that clients that have claimed a spot on the segment will be able to travel at the specified departure time and that there will be a spot for the client on the segment. This prevents user dissatisfaction and potential application errors (e.g., crashes) that may occur if features were changed after the segment is confirmed and made available to clients.

For segments initiated by the segment service provider and/or by clients, the segment sourcing engine 120 can interact with the operator systems 142 of the operators 140 to select jets for the segments and obtain information about the jets (e.g., number of spots on the jet, amounts for particular segments, range, flight time rates, etc.). For example, when the segment scheduling engine 116 creates a segment (e.g., a service provider scheduled segment or a client-initiated segment), the segment sourcing engine 120 can interact with the operator systems 142 to identify a jet of the same type as the created segment that can be used for the segment. For example, the segment sourcing engine 120 can submit a request to each operator system 142 for a jet of the type of the created segment. In response to receiving a request, the operator systems 142 can obtain data regarding available jets from their respective operator segment data storage units 144 and provide, to the segment sourcing engine 120, the information about any available jets that the operator 140 is willing to operate for the created segment (e.g., number of spots on the jet, rates for particular segments, range, etc.). If multiple operators 140 have an available jet, the segment sourcing engine 120 can select a jet for the created segment based on the information provided by the operator systems 142.

The segment scheduling engine 116 can also trigger navigation of a jet to a geographic location (e.g., airport) corresponding to the departure code and/or the destination code. For example, the jet may not be at the airport of the departure code. In this example, the segment scheduling engine 116 can trigger navigation of the jet to the airport corresponding to the departure code prior to the departure time.

Triggering navigation of a jet can include automatically generating a flight plan and transmitting the flight plan to the operator. The flight plan can include the code for the location at which the jet will depart and the departure time for the jet. If the flight plan is for the segment, the flight plan can also include the destination code. Triggering navigation of a jet can also include automatically updating a scheduling system, e.g., of the operator, to specify when and where the jet need to be for the segment.

In some implementations, the front-end servers 112 of the segment management system 110 communicate with the operators systems 142 using application programming interfaces (APIs). The use of the APIs require computational power to communicate data. To reduce the amount of computational power used by the APIs, the segment management system 110 may identify a subset (e.g., less than all) of operators 140 for a particular segment and provide the request to only the operators in the subset. The segment management system 110 can identify the subset of operators based on the departure geographic code (e.g., identify operators that operate jets in the geographic area from which the segment will depart), previous segments provided by the operators (e.g., previously provided a jet for the same origin and destination), types of jets that the operator operates, and/or other appropriate criteria. In some implementations, communications with operators can be carried out using other communications means (e.g., phone). When the segment has been confirmed by the operator, the selected aircraft will be deployed to the origin at an appropriate time so that the selected aircraft will be available for any clients that have obtained spots (e.g., seats) on the created segment.

FIGS. 2-5 are screenshots of example graphical interfaces of an operator portal that enables an operator to provide features of segments that the operator is willing to operate and make available to clients of the segment service provider. The interfaces also allow the operator to view distribution outputs that will be provided to the operator if the operator confirms the segment and operates the segment. The operator can then determine whether or not to confirm the segment, or to lock the distribution output for a specified time period. The interfaces also enable the operator to view information about segments the operator has confirmed and segments for which the operator has locked a distribution output. The interfaces can be presented by an application executing on an electronic device of the operator.

Figure 2:
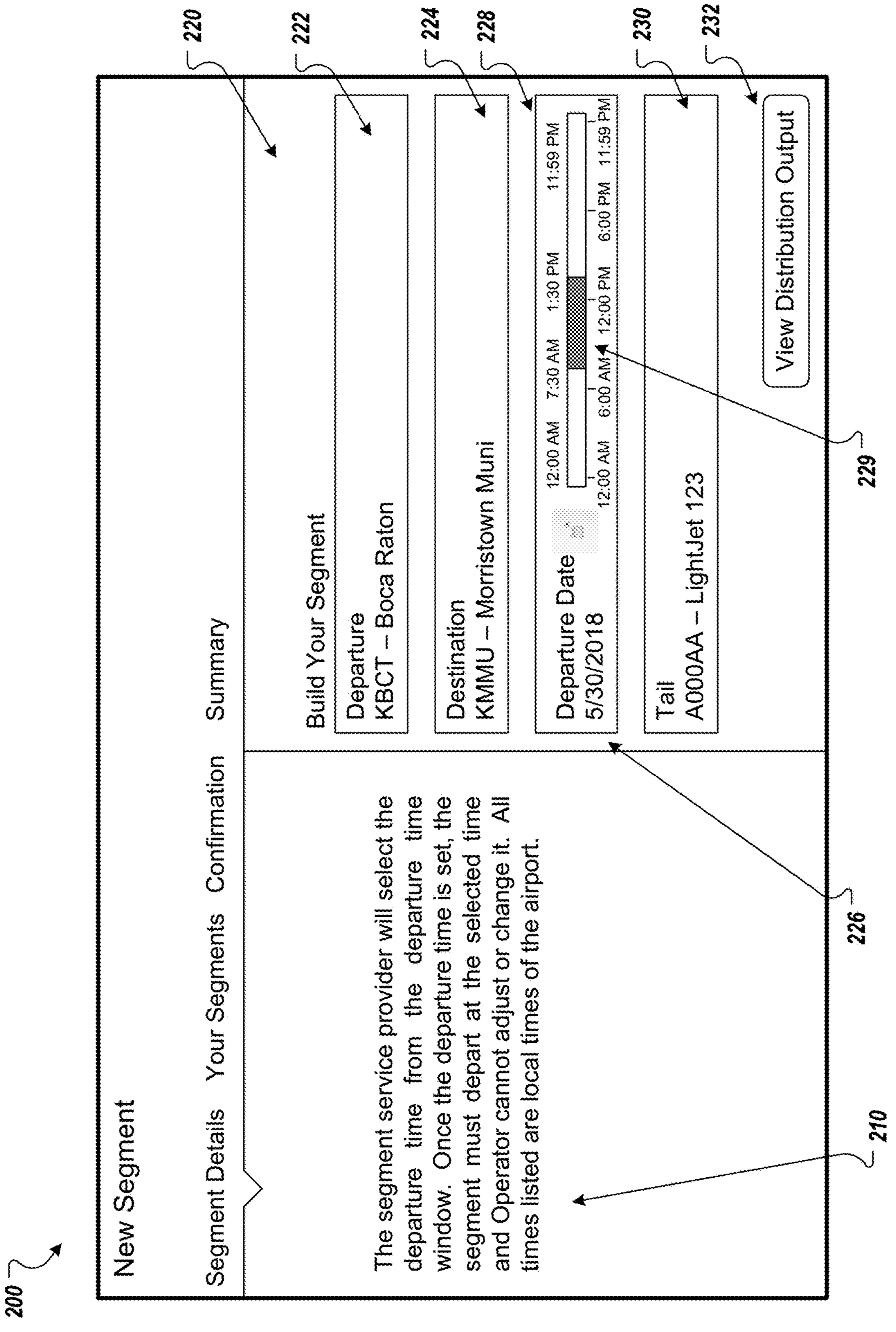
FIG. 2 is a screenshot of an example graphical interface that enables an operator to initiate a segment and specify features of the segment.

FIG. 2 is a screenshot of an example graphical interface 200 that enables an operator to initiate a segment and specify features of the segment. The example interface 200 includes an information section 210 that provides information, e.g., instructions, to the operator regarding specifying features of a segment. In this example, the information section 210 indicates that the segment service provider will select the departure time for the segment from the departure time window specified by the operator and that, once the departure time is set, the departure time cannot be adjusted. For example, the segment management system can remove controls that enable the operator to specify the departure time for the segment or to adjust other features of the segment once the departure time is set or in response to other events (e.g., confirmation of the segment, a notification of the segment being sent to a client, or a spot being claimed on the segment by a client). In other words, in response to detecting the occurrence of a "lock condition", such as detecting a client claiming a spot on the segment, the segment management system can prevent specified (or any) changes to the segment.

The interface 200 also includes a segment building section 220 that enables the operator to specify features of a segment that the operator is willing to operate for the segment service provider. The segment building section 220 includes a departure selector control 222 that enables the operator to specify (e.g., select) a departure code for the segment. In this example, the departure code is an airport code that identifies the departure airport. In other examples, the departure code can be another type of geographic identifier, such as a city name, state name, etc. The departure selector control 222 can be implemented as a drop down menu that, when interacted with, presents a list of departure codes from which the operator can select. The departure selector control 222 can also be implemented as a text entry box or other type of interface control that enables an operator to specify a departure code. In this example, the operator selected the departure code "KBCT" for the Boca Raton Airport.

The segment building section 220 includes a destination selector control 224 that enables the operator to specify (e.g., select) a destination code for the segment. In this example, the destination code is an airport code that identifies the destination airport. In other examples, the destination code can be another type of geographic identifier, such as a city name, state name, etc. The destination selector control 224 can be implemented as a drop down menu, text entry box or other type of interface control that enables an operator to specify a destination code. In this example, the operator selected the destination code "KMMU" for Morristown Municipal Airport.

In some implementations, the departure selector control 222 and the destination selector control 224 each include a pre-specified set of codes for which the segment service provider provides segments. In some implementations, the departure selector control 222 and the destination selector control 224 can allow operators to specify any airport (or other) code for which the operator is willing to operate a segment.

The segment building section 220 also includes a departure date selector control 226 that enables the operator to specify the departure date for the segment (e.g., using a calendar interface) and a departure time window selector control 228 that enables the operator to specify a departure time window for the departure of the segment. As described above, the segment service provider can select a departure time for the segment that is on the departure date specified by the operator and that is within the departure time window specified by the operator. In some implementations, the segment building section 220 can include a time selector control that enables the operator to specify an exact departure time rather than a departure time window.

The departure time window selector control 228 includes a bar 229 that can be moved along a timeline to specify the departure time window. For example, moving the bar 229 to the left results in a departure time window that starts and ends at an earlier time. Similarly, moving the bar 229 to the right results in an update to presentation of the interface 200, which can include, updating a departure time window that starts and ends at a later time than prior to the movement of the bar 229.

The operator can also expand or collapse the bar 229 to expand or collapse the departure time window through interaction with the interface 200. For example, the operator can move the left edge of the bar (e.g., by selecting and dragging) to adjust the start of the departure time window without changing the end of the departure time window. Moving the left edge of the bar 229 to the left would cause the interface 200 to be updated by expanding the departure time window to start at an earlier time while moving the left edge of the bar 229 to the right would cause the interface 200 to be updated by collapsing the departure time window to start at a later time.

Similarly, the operator can move the right edge of the bar (e.g., by selecting and dragging) to adjust the end of the departure time window without changing the start of the departure time window. Moving the right edge of the bar 229 to the left would collapse the departure time window to end at an earlier time while moving the right edge of the bar 229 to the right would expand the departure time window to end at a later time.

The time for the point on the timeline at which the left side of the bar 229 ends is the start time for the departure time window and the time for the point on the timeline at which the right side of the bar 229 ends is the end time for the departure time window. In this example, the departure time window is from 7:30 AM-1:30 PM. In some implementations, the start and end times are presented in the time window selector control 228, e.g., above each end of the bar 229 as shown in FIG. 2. This provides confirmation to the operator of the departure time window being specified. As the operator adjusts the bar 229, the times presented by the interface 200 can be updated.

The segment building section 220 also includes a jet selector control 230 that enables the operator to specify a jet or type for the segment. In some implementations, the jet selector control 230 implemented a drop down menu that includes a list of the operator's jets. For example, the operator can provide, to the segment management system, data identifying each jet that the operator is willing to operate for segments provided by the segment service provider. This information can include, for each jet, the tail number for the jet, the number of spots (e.g., seats) on the jet, the range of the jet, the type of jet (e.g., light, midsize, heavy, propeller, rotorcraft, etc.), amenities of the jet, and/or other appropriate information about the jet. The segment management system can populate the drop down menu for each operator with the jets of the operator so that each operator can quickly select its jet for segments.

After the operator has specified the features of the segment, the operator can interact with, e.g., select, a view amount control 232 that requests presentation of a distribution output that the operator would receive if the operator operated a segment based on the specified features. In this example, the operator would be requesting a distribution output for a segment from KBCT to KMMU on May 30, 2018 that departs between 7:30 AM and 1:30 PM, and that uses a "LightJet 123" with tail number "A000AA."

The application executing on an electronic device of the operator can detect interaction with the view amount control 232 and, in response, transmit the features to the segment management system. The segment management system can determine a distribution output that would be provided to the operator based on the features and provide data specifying the distribution output to the operator system. The application can navigate to a graphical interface 300 as shown in the screenshot illustrated in FIG. 3. The example interface 300 presents the distribution output and enables the operator to lock or confirm the segment.

The example interface 300 presents the features of the segment, including the jet element 310 that presents data identifying the jet for the segment, a departure date element 320 that presents the departure date and departure time window for the segment, and a route element 330 that presents the departure code and the destination code for the segment. The interface 300 also includes an amount element 340 that presents the distribution output that the operator would receive for operating a segment that is based on the features presented in the elements 310-330. In this example, the distribution output is 10,000, which can be a monetary amount.

The interface 300 also includes a lock control 350 and a confirmation control 360. The lock control 350 enables the operator to lock the distribution output for the segment for a specified time period, e.g., four hours, one day, etc. The time period can be specified by the segment service provider. If the operator interacts with, e.g., selects, the lock control 350, the operator system can transmit data specifying the interaction or a request to lock the distribution output to the segment management system. In response, the segment management system can allow the operator to confirm the segment at the same distribution output until the specified time period elapses.

The confirmation control 360 enables the operator to confirm the segment. If the operator interacts with, e.g., selects, the confirmation control 360, the operator system can transmit data specifying the interaction or a request to confirm the segment to the segment management system. In response, the segment management system can create a segment based on the features specified by the operator, notify clients of the availability of the segment, and enable the clients to claim a spot on the segment.

Creating the segment can include determining a departure time for the segment that is within the departure time window specified by the operator. Creating the segment can also include determining a required submission for clients to claim a spot on the segment, as described above.

Figure 4:
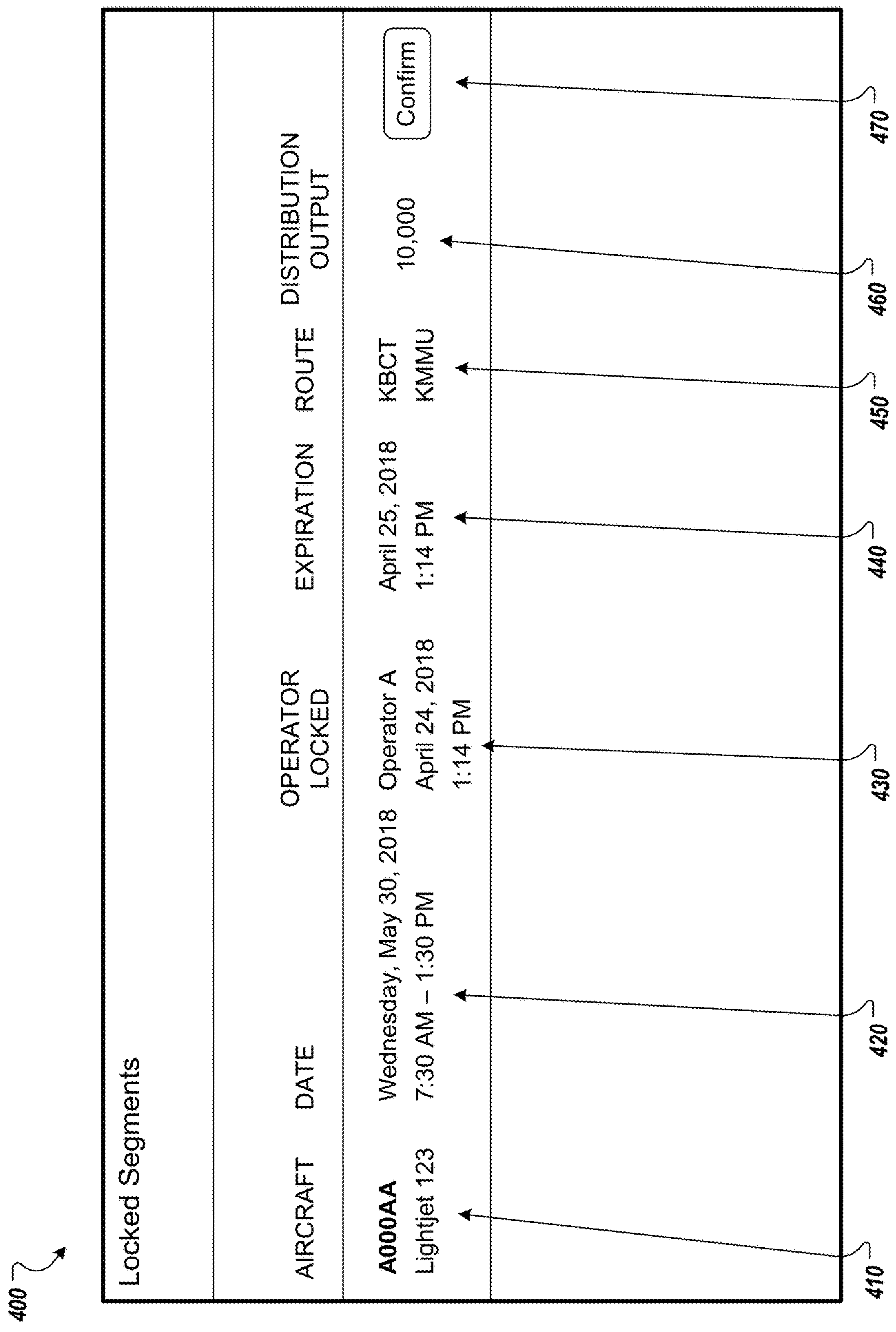
FIG. 4 is a screenshot of an example graphical interface that enables an operator to confirm a locked segment.

FIG. 4 is a screenshot of an example graphical interface 400 that enables an operator to confirm a locked segment. The interface 400 can be presented, for example, in response to the operator interacting with the lock control 350 or selecting a link (or other navigation control) to navigate to the interface 400. The interface 400 can present information about one or more segments for which the operator has locked a distribution output.

In this example, the interface 400 presents information about the example segment from KBCT to KMMU described above with reference to FIGS. 2 and 3. For example, the operator may have interacted with the lock control 350 of FIG. 3 to lock the distribution output of 10,000 for the segment. The interface 400 includes a jet element 410 that presents data identifying the jet for the segment, a departure date element 420 that presents the departure date and departure time window for the segment, and an operator locked element 430 that presents the operator (Operator A in this example) that locked the distribution output and the time at which the distribution output was locked. The interface 400 also includes an expiration time element 440 that presents an expiration time for the locked distribution output (e.g., the time at which the specified time period for the locked distribution output elapses), a route element 450 that presents the departure code and the destination code for the segment, and an amount element 460 that presents the locked distribution output.

The interface 400 also includes a confirmation control 470 enables the operator to confirm the segment. If the operator interacts with, e.g., selects, the confirmation control 470, the operator system can transmit data specifying the interaction or a request to confirm the segment to the segment management system, similar to the lock control 360 of FIG. 3. This interface 400 allows an operator to quickly view information about the segment(s) for which a distribution output has been locked and to confirm any segments that the operator wants to confirm. This allows the operator to more efficiently obtain information about the segments with locked distribution outputs without having to navigate to multiple interfaces, e.g., one for each segment, to obtain the information.

FIG. 5 is a screenshot of an example graphical interface 500 that presents segments that an operator has confirmed. The interface 500 allows an operator to view each segment that has been confirmed and that is scheduled for departure in the future and/or segments that have previously been operated by the operator.

The interface 500 includes a segment information element 510, 520, and 530 for each segment. Each segment information segment 510, 510, and 530 presents data identifying the jet for the segment, a departure date for the segment, a departure time window for the segment, the route for the segment (e.g., the departure code and destination code), the operator that confirmed the segment and the time at which the segment was confirmed, and the distribution output the operator will receive (or has received) for operating the segment.

Figure 6:
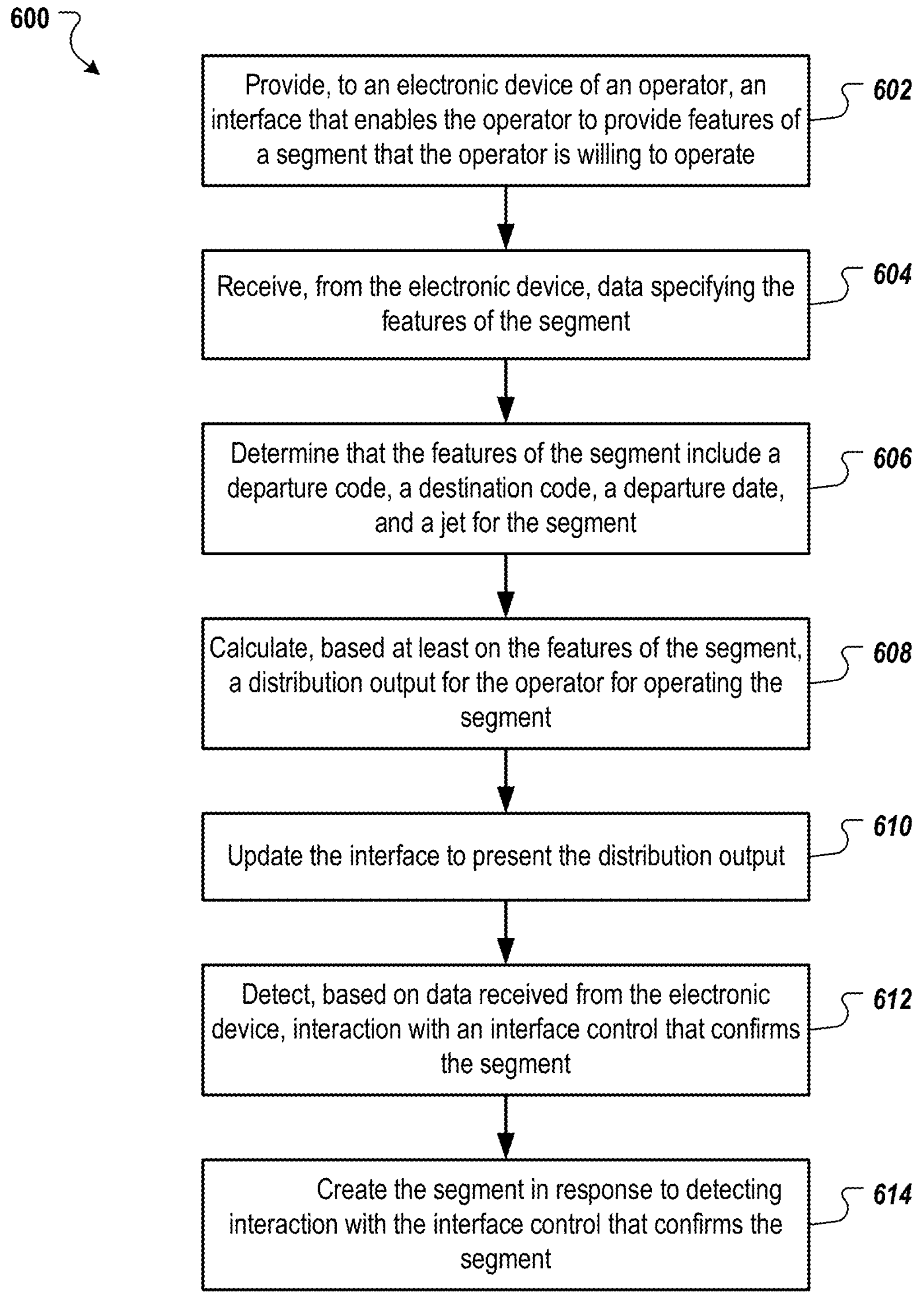
FIG. 6 is a flow chart of an example process for creating a segment.

FIG. 6 is a flow chart of an example process 600 for creating an operator-initiated segment. Operations of the process 600 can be performed, for example, by one or more data processing apparatus, such as the segment management system 110. Operations of the process 600 can also be implemented as instructions stored on a non-transitory computer readable medium. Execution of the instructions cause one or more data processing apparatus to perform operations of the process 600.

An interface is provided to an electronic device of a third party operator (602). For example, a segment management system of a segment service provider can provide the interface, e.g., by way of an application executing on the electronic device of the operator. The operator can be a different entity from the segment service provider and different from clients of the segment service provider. For example, the operator may operate jets as part of a private jet charter business ran by the operator or for other purposes. The segment service provider can provide segments for clients of the segment service provider. The operator can operate jets that are used for some of the segments.

The interface can enable the operator provide features of a segment that the operator is willing to operate for the segment service provider. An example interface that enables the operator to provide features of a segment is illustrated in FIG. 2 and described above.

Data specifying features of the segment are received from the electronic device of the operator (604). The operator can interact with the interface to select or otherwise specify features of a segment that the operator is willing to operate. The features can include a departure code, a destination code, a departure date, a departure time window, a jet or type of jet that would be used for the segment, and/or other appropriate features. The electronic device can detect interactions with the interface, save data specifying the features specified using the interface, and transmit the data, e.g., to the segment management system. For example, the electronic device can transmit the data in response to user interaction with an interface control, e.g., an interface control for requesting to view an amount that the operator would receive from the segment service provider for operating the segment and making the segment available for clients of the segment service provider.

In some implementations, the operator can also specify a departure time window for the segment. The departure time window is a time window in which the operator is willing to have the segment depart from the departure location corresponding to the departure code. The actual departure time for the segment can be selected, e.g., by the segment management system or a human segment scheduler of the segment service provider, that is within the departure time window.

A determination is made that the features of the segment include a departure code, a destination code, a departure date, and a jet (or type of jet) for the segment (606). For example, the segment management system can evaluate the received data to confirm that the data includes at least those features.

A distribution output for the operator is determined based at least on the features of the segment specified by the operator (608). The distribution output is an amount that the segment service provide is willing to provide to the operator for operating the segment and making the segment available to clients of the segment service provider. The distribution output can be determined based on one or more of the features of the segment.

In some implementations, the distribution output is based on a duration of time between a current time (e.g., date and/or time) at which features of the segment are received and the departure date for the segment. For example, the distribution output can be based on a number of days between the current time and the departure date.

In some implementations, an hourly rate for the segment is determined based on the duration of time between the current time and the departure. The hourly rate can be determined based on the duration of time and the type of jet for the segment. For example, the segment management system can maintain one or more hourly rates for each type of jet (e.g., light, midsize, heavy, propeller, rotorcraft, etc.). The hourly rates for each type of jet can include a minimum hourly rate for the type of jet and a maximum hourly rate for the type of jet.

The hourly rate for the segment can be determined using Relationship 1 below:

$$\text{Hourly Rate}=k*\ln(\text{days}-1)+b \quad (1)$$

In Relationship 1, the hourly rate for the segment is based on the natural logarithm of the number of days between the current time and the departure date minus one. The parameter k can be determined using Relationship 2 below:

$$k = \frac{(\max hourlyrate - \min hourlyrate)}{(\ln(\max day - 1) - \ln(\min day - 1))} \quad (2)$$

In Relationship 2, the parameter "maxhourlyrate" is the maximum hourly rate for the type of jet selected for the segment and the parameter "minhourlyrate" is the minimum hourly rate for the type of jet selected for the segment. The parameter "max_day" represents a maximum number of days prior to departure a segment can be initiated by an operator and the parameter "min_day" is a minimum number of days prior to departure a segment can be initiated by an operator. For example, the segment service provider may require that the departure date for an operator-initiated segment be between 3-30 days from the time at which the operator provides features of the segment.

The parameter b can be determined using Relationship 3 below:

$$b = \text{maxhourlyrate} - k^*(\ln(\text{maxday} - 1)) \quad (3)$$

In Relationship 3, the parameter maxhourly rate is the maximum hourly rate for the type of jet selected for the segment.

The distribution output can be determined based on the hourly rate determined using Relationship 1, the flight time for the segment (e.g., an estimated flight time), and a number spots on the segment (e.g., the total number of spots or the number of spots being made available to the clients of the segment service provider). For example, the distribution output can be determined using Relationship 4 below:

$$\text{Distribution Amount} = \text{Hourly Rate}^*\text{Flight Time}^*\text{Number of Spots} \quad (4)$$

In Relationship 4, the parameter "Hourly Rate" is the hourly rate determined using Relationship 1, the parameter "Flight Time" is the flight time of the segment, and the parameter "Number of Spots" is the number of spots on the segment. The parameter Flight Time can be determined using Relationship 5 below:

$$\text{Flight Time} = \max\left(\frac{(\text{estimated flight time} + \min taxitime}{\text{minutes per hour}}, \frac{\min chargetime}{\text{minutes per hour}}\right) \quad (5)$$

In Relationship 5, the parameter "estimatedflighttime" is an estimated flight time for the segment. The estimated flight time can be based on the departure code and the destination code for the segment. For example, the estimated flight time can be based on previous segments from the location corresponding to the departure code to the location corresponding to the destination code. In a particular example, the estimated flight time is based on an average of the flight times for the previous segments. The parameter "mintaxitime" is a minimum amount of time for the jet to taxi before taking off and/or after landing. This can be determined based on historical taxi times for the type of jet, the departure airport, and/or the destination airport. In another example, the minimum taxi time is an average across all (or a portion of) previous segments provided by the segment service provider. The parameter "minutesperhour" can be 60 (e.g., sixty minutes in an hour) and the parameter "minchargetime" can be a minimum amount of time that can be used to determine the flight time.

Figure 3:
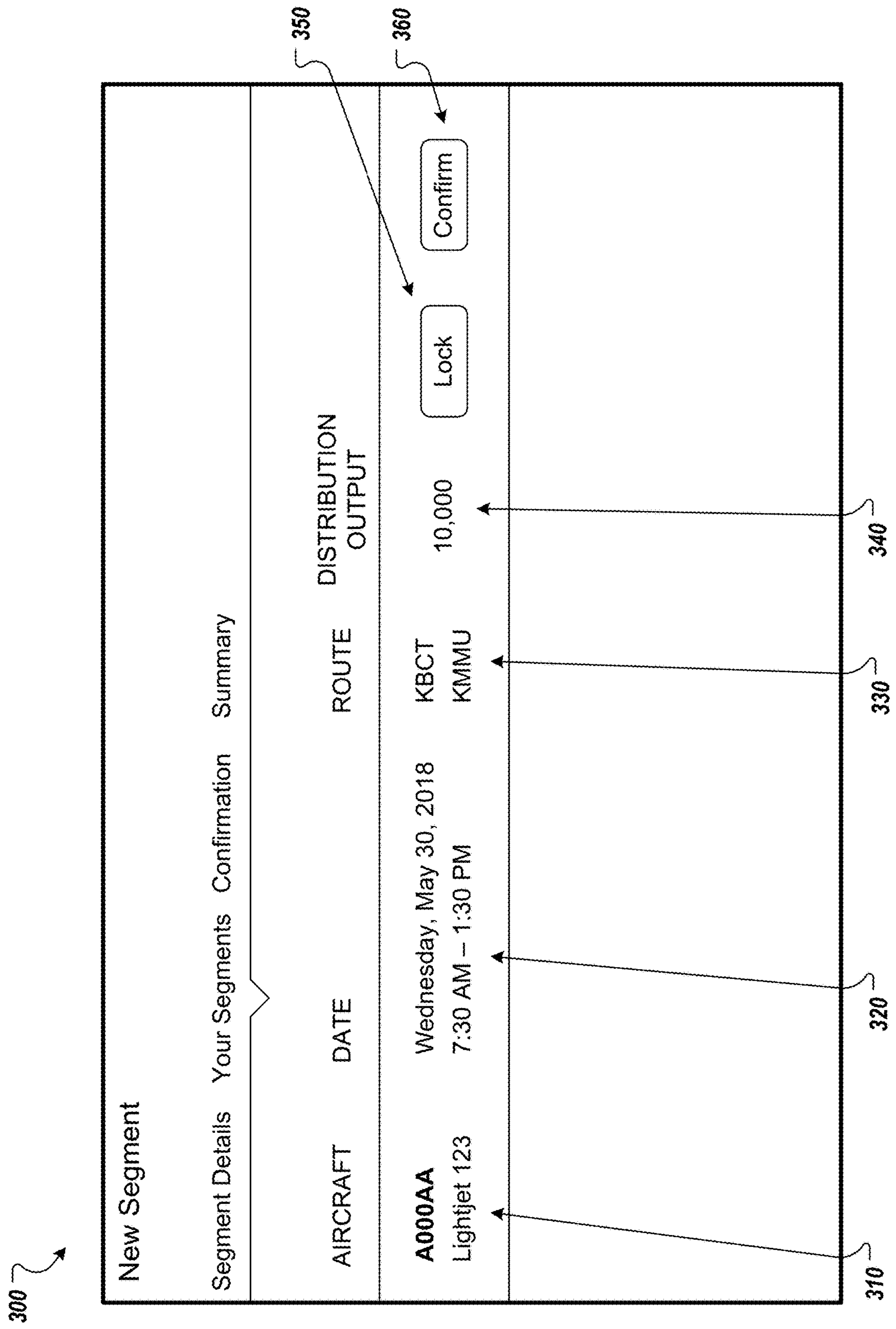
FIG. 3 is a screenshot of an example graphical interface that enables an operator to lock or confirm a segment.

The interface is updated to present the distribution output (610). For example, data specifying the distribution output can be transmitted to the electronic device of the operator. The electronic device can then update the interface to present the distribution output. In some implementations, updating the interface can include presenting the distribution output at the interface at which the operator specified the features of the segment. In some implementations, updating the interface can include navigating to another interface that presents the distribution output, e.g., with a summary of information about the segment and/or interface controls to lock or confirm segment. An example interface for presenting the distribution output is illustrated in FIG. 3 and described above.

Interaction with an interface control that confirms the segment is detected (612). For example, the operator may interact with an interface control that confirms the segment. In response, the electronic device of the operator can transmit data specifying the interaction, e.g., to the segment management system. The data can be used to determine that the operator has confirmed the segment and is willing to operate the segment for the distribution output.

The segment is created in response to detecting the interaction with the interface control (614). For example, the segment can be scheduled to travel from the departure location corresponding tot eh departure code to the destination location corresponding to the destination code on the departure date specified by the operator. If the operator specified a departure time window, the departure time can be set within the departure time window.

Clients of the segment service provider can be notified of the availability of the created segment. For example, push notifications may be sent to at least a subset of the clients of the segment service provider. The notifications can specify a required submission for claiming a spot on the segment, features of the segment (e.g., departure code, destination code, departure date and time, the jet or type of jet, amenities of the jet, etc.), and code (e.g., an active link) that navigates directly to an application page within the application 132 (or to a web page in a web interface) to claim a spot on the segment. Clients that receive the notification can claim a spot on the segment, e.g., by interacting with an active link and claiming the spot at the application page.

In some implementations, notifying the clients can include updating a calendar interface to present a segment indicator for the segment under the departure date in the calendar. In this example, after the segment is created, a segment indicator (e.g., a dot) will be presented under the departure date for the segment to represent the created segment. Clients can claim a spot on the segment by interacting with the segment indicator, as described above.

Figure 7:
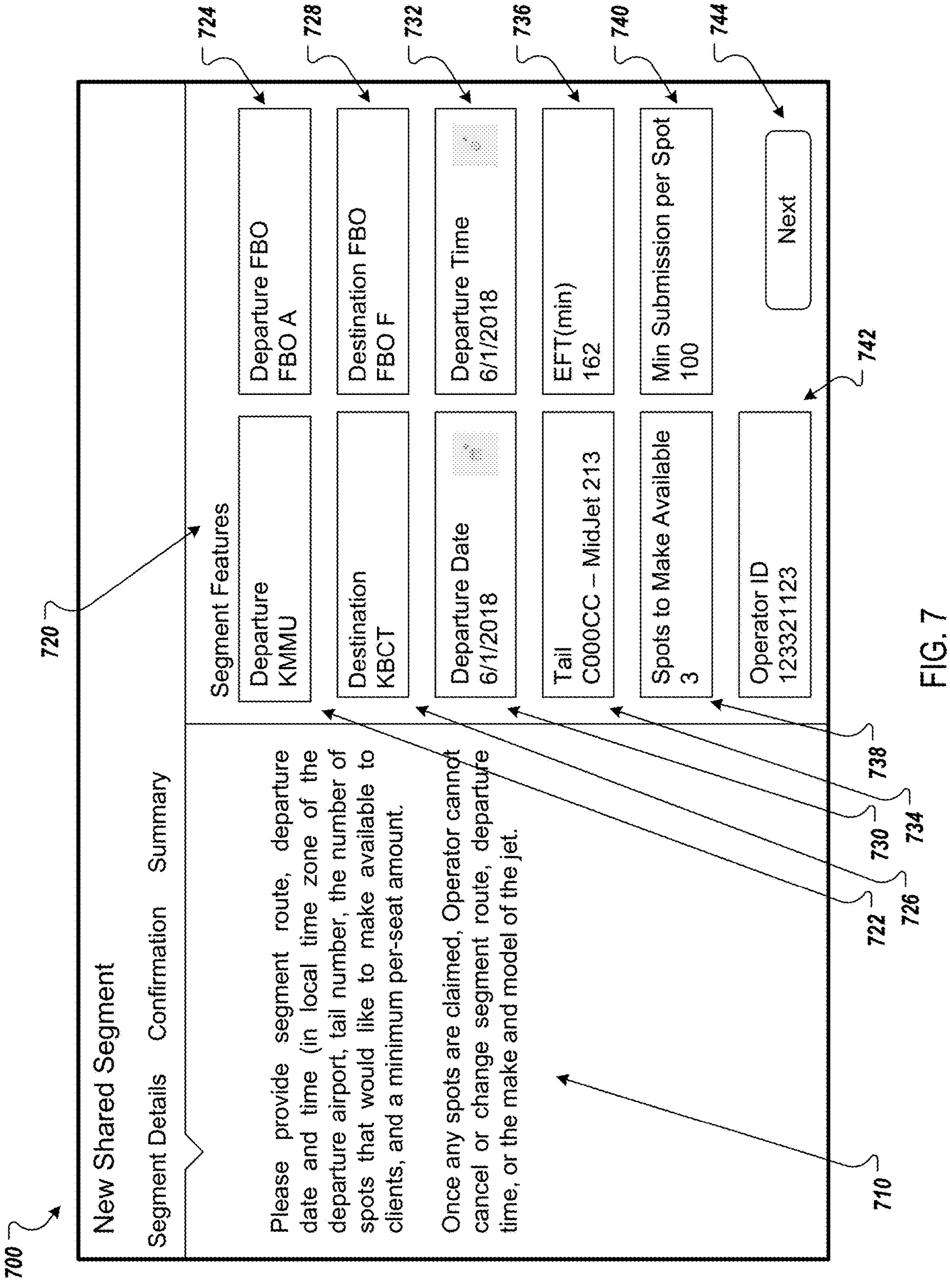
FIG. 7 is a screenshot of an example graphical interface that enables an operator to make spots available on a segment operated by the operator.
Figure 8:
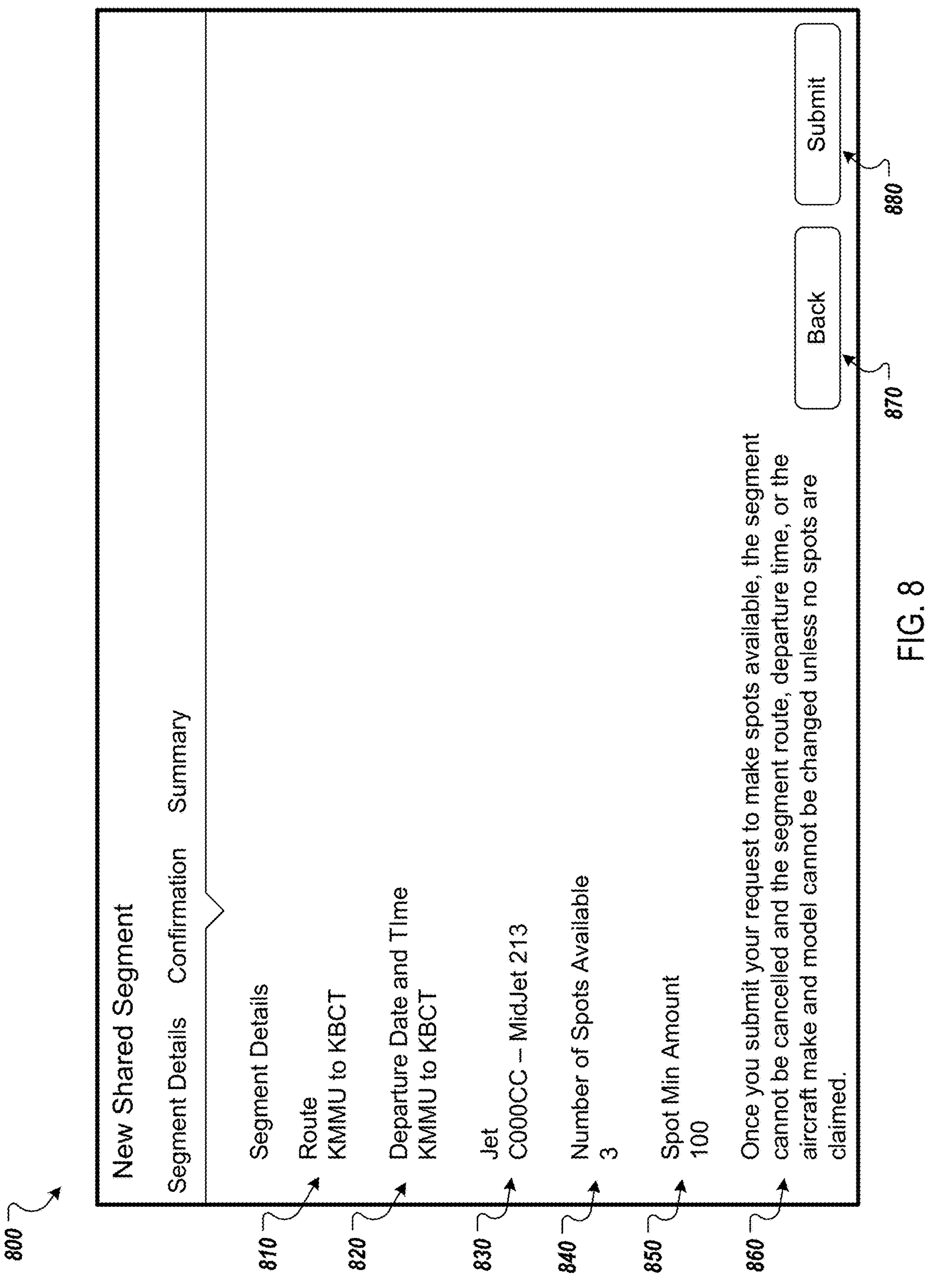
FIG. 8 is a screenshot of an example graphical interface that enables an operator to confirm availability of spots on a segment operated by the operator.

FIGS. 7 and 8 are screenshots of example graphical interfaces of an operator portal that enables an operator to make individual spots on segments available to clients of the segment service provider. For example, an operator can make fewer than all spots on a segment (e.g., a charter) available for the clients. The interfaces enable the operator to provide features of the segments and minimum required submissions for spots on the segments. The interfaces also enable the operators to view summaries of the segments, e.g., prior to confirming the segments. The interfaces can be presented by an application executing on an electronic device of the operator.

FIG. 7 is a screenshot of an example graphical interface 700 that enables an operator to make spots available on a segment operated by the operator. The example interface 700 includes an information section 710 that provides information, e.g., instructions, to the operator regarding specifying features of a segment and the number of spots being made available on the segment. In this example, the information section 710 also indicates that, once a spot is claimed on the segment, the operator cannot change the route, departure time, or make and model of the jet. For example, the segment management system can remove controls that enable the operator to specify the departure code, the destination code, the departure time, and the type of jet for a segment in response to a client claiming a spot on the segment.

The interface 700 also includes a feature specification section 720 that enables the operator to specify features of a segment for which the operator is willing to make available one or more spots (e.g., but not all of the spots). The feature specification section 720 includes a departure selector control 722 that enables the operator to specify (e.g., select) a departure code for the segment. In this example, the departure code is an airport code that identifies the departure airport. In other examples, the departure code can be another type of geographic identifier, such as a city name, state name, etc. The departure selector control 722 can be implemented as a drop down menu that, when interacted with, presents a list of departure codes from which the operator can select. The departure selector control 722 can also be implemented as a text entry box or other type of interface control that enables an operator to specify a departure code. In this example, the operator selected the departure code "KMMU" for Morristown Municipal Airport.

The feature specification section 720 also includes a departure fixed-base operator (FBO) selector control 724 that enables the operator to specify an FBO at the departure airport. An FBO is an entity that provides support services for operators at airports. The departure FBO selector control 724 enables the operator to select an FBO for the departure airport. The departure FBO control 724 can be implemented as a drop down menu that, when interacted with, presents a list of FBOs at the departure airport specified using the departure selector control 722. The departure FBO control 724 can also be implemented as a text entry box or other type of interface control that enables an operator to specify a departure FBO. In this example, the operator selected FBO A as the departure FBO.

The feature specification section 720 also includes a destination selector control 726 that enables the operator to specify (e.g., select) a destination code for the segment. In this example, the destination code is an airport code that identifies the destination airport. In other examples, the destination code can be another type of geographic identifier, such as a city name, state name, etc. The destination selector control 726 can be implemented a drop down menu, text entry box or other type of interface control that enables an operator to specify a destination code. In this example, the operator selected the destination code "KBCT" for the Boca Raton airport.

In some implementations, the departure selector control 722 and the destination selector control 726 each include a pre-specified set of codes for which the segment service provider provides segments. In some implementations, the departure selector control 722 and the destination selector control 726 can allow operators to specify any airport (or other) code for which the operator is willing to operate a segment.

The feature specification section 720 also includes a destination FBO selector control 728 that enables the operator to specify an FBO at the destination airport. The destination FBO selector control 728 enables the operator to select an FBO for the destination airport. The destination FBO control 728 can be implemented as a drop down menu that, when interacted with, presents a list of FBOs at the destination airport specified using the destination selector control 728. The destination FBO control 728 can also be implemented as a text entry box or other type of interface control that enables an operator to specify a destination FBO. In this example, the operator selected FBO F as the destination FBO.

The feature specification section 720 also includes a departure date selector control 730 that enables the operator to specify the departure date for the segment (e.g., using a calendar interface) and a departure time selector control 732 that enables the operator to specify the departure time for the segment (e.g., using a clock interface, drop down menu, or other appropriate interface control). As the operator may have other passengers on a segment for which the operator is making available fewer than all spots, the operator may not always have flexibility in providing a departure time window. An operator may also be making available spots on a scheduled segment for which the departure time cannot be adjusted. Thus, the time selector control 732 may allow the operator to specify a time rather than a time window. In other examples, the time selector control 732 can enable the operator to specify a departure time window, similar to the time selector control 229 of FIG. 2.

The feature specification section 720 also includes a jet selector control 734 that enables the operator to specify a jet or type for the segment. In some implementations, the jet selector control 734 implemented a drop down menu that includes a list of the operator's jets. For example, the operator can provide, to the segment management system, data identifying each jet that the operator is willing to operate for segments provided by the segment service provider. This information can include, for each jet, the tail number for the jet, the number of spots (e.g., seats) on the jet, the range of the jet, the type of jet (e.g., light, midsize, heavy, propeller, rotorcraft, etc.), amenities of the jet, and/or other appropriate information about the jet. The segment management system can populate the drop down menu for each operator with the jets of the operator so that each operator can quickly select its jet for segments.

The feature specification section 720 also includes an estimated flight time selector control 736 that enables the operator to specify an estimated flight time for the segment. The estimated flight time selector control 736 can be implemented a drop down menu, text entry box or other type of interface control that enables an operator to specify an estimated flight time. In this example, the operator selected an estimated flight time of 162 minutes. The segment service provider can provide the estimated flight time to each client that claims a spot on the segment, e.g., as part of an itinerary for the segment.

The feature specification section 720 also includes a spot number selector control 738 that enables the operator to specify the number of spots that the operator is making available to clients of the segment service provider. The spot number selector control 738 can be implemented a drop down menu, text entry box or other type of interface control that enables an operator to specify a number of spots. In a drop down menu implementation, the list of numbers that represent the number of spots can be limited to the total number of spots available on the jet selected using the jet selector control 734.

The feature specification section 720 also includes a minimum submission per spot selector control 740 that enables the operator to specify a minimum required submission clients would be required to submit to claim a spot on the segment. This required submission may be the amount required to be received by the operator for each spot claimed by a client of the segment service provider. The segment service provider can require a different submission from the clients, e.g., a lower or higher amount. For each spot claimed by a client, the segment service provider can provide the minimum submission to the operator.

The feature specification section 720 also includes an operator ID element 742 that presents an identifier for the operator. For example, each the segment service provider may assign each operator a unique identifier, which can be presented in the operator ID element 742. The feature specification section 720 also includes a next control 744 that, when interacted with, causes the operator system to present the graphical interface 800, as shown in the screenshot of FIG. 8.

The example interface 800 enables an operator to confirm availability of spots on a segment operated by the operator. The interface 800 also presents a summary of the features of the segment so that the operator can view the features prior to confirmation. For example, the interface 800 includes a route element 810 that presents the departure code and the destination code for the segment, a departure date element 820 that presents the departure date and time for the segment, a jet element 830 that presents the jet selected for the segment, and a number of spots element 840 that presents the number of spots on the segment that the operator is making available to clients of the segment service provider. The interface 800 also includes a minimum submission element 850 that presents the minimum required submission by clients to claim a spot on the segment and an instruction element 860 that informs the operator that, once the operator submits the request to make spots available, the segment cannot be cancelled and the segment route, departure time, or the aircraft make and model cannot be changed unless no spots are claimed.

The interface 800 also includes a back navigation control 870 that, when interacted with, causes the operator system to navigate back to the interface 700 of FIG. 7. The interface 800 also includes a submit control 880 that, when interacted with, causes the operator system to submit the features of the segment to the segment management system. The segment service provider can then create the segment, notify clients about the availability of the segment, and enable the clients to claim up to the number of spots specified by the operator.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for enabling segment creation, comprising:

one or more front-end servers that interact, over a data communication network with electronic devices of third party operators;

one or more back-end servers in data communication with the one or more front-end servers and that include one or more data processors, the one or more front-end servers or the one or more back-end servers being configured to perform operations comprising:

providing, to an electronic device of a third party operator, an interface that enables the operator to provide features of a segment that the operator is willing to operate for a segment provider that provides segments for clients;

receiving, from the electronic device, data specifying the features of the segment;

determining that the features of the segment include a departure code, a destination code, a departure date, a jet for the segment, and a departure time window defining a given time period in which the third party operator is willing to operate the jet for the segment;

calculating, based at least on the features of the segment, a distribution output that the segment provider will provide to the operator for operating the segment and making the segment available for the clients of the segment provider;

updating the interface to present the distribution output to the third party operator and an interface control that enables the third party operator to confirm the segment;

detecting, based on data received from the electronic device of the operator, interaction with the interface control that confirms the segment being provided by the operator according to the features of the segment;

creating the segment in response to detecting interaction with the interface control that confirms the segment, wherein creating the segment comprises selecting a given departure time for the segment that is within the given time period defined by the departure time window;

in response to creating the segment, enabling the clients of the segment provider to claim spots on the segment;

determining that at least one spot on the segment has been claimed by one or more of the clients of the segment provider; and in response to determining that the at least one spot on the segment has been claimed, scheduling the segment and preventing changes to the features of the segment.

2. The system of claim 1, wherein calculating, based at least on the features of the segment, a distribution output for the operator for operating the segment comprises:

determining an hourly rate for the segment based on a duration of time between a current time at which data specifying the features of the segment is received and the departure date;

determining, based on the departure code and the destination code, a segment duration for the segment;

identifying a number of spots on the segment; and determining the distribution based on a combination of the hourly rate, the segment duration, and the number of spots on the segment.

3. The system of claim 1, wherein the operations comprise triggering navigation of the jet to a geographic location corresponding to the departure code or the destination code.

4. The system of claim 3, wherein triggering navigation of the jet to the geographic location corresponding to the departure code or the destination code comprises:

generating a flight plan from a current location of the jet to the geographic location;

transmitting the flight plan to the third party operator; and automatically updating a scheduling system of the third party operator based on the flight plan.

5. The system of claim 1, wherein the operations comprise:

detecting, based on data received from the electronic device, interaction with an interface control that holds the distribution output constant for a specified time period; and keeping the distribution output constant for the specified time period.

6. The method of claim 1, wherein enabling the clients of the segment provider to claim spots on the segment comprises:

notifying multiple different clients that the segment is available; and enabling the multiple different clients to claim remaining spots on the segment through a client-side application.

7. The system of claim 6, wherein the operations comprise calculating a required submission for each spot based on the distribution output, wherein notifying the multiple different clients comprising providing data specifying the determined required submission for each spot.

8. The system of claim 6, wherein the operations comprise:

receiving, from a client, a request to claim a spot on the segment; and reserving a spot on the segment for the client.

9. A method, comprising:

providing, to an electronic device of a third party operator, an interface that enables the operator to provide features of a segment that the operator is willing to operate for a segment provider that provides segments for clients;

receiving, from the electronic device, data specifying the features of the segment;

determining that the features of the segment include a departure code, a destination code, a departure date, a jet for the segment, and a departure time window defining a given time period in which the third party operator is willing to operate the jet for the segment;

calculating, based at least on the features of the segment, a distribution output that the segment provider will provide to the operator for operating the segment and making the segment available for the clients of the segment provider;

updating the interface to present the distribution output to the third party operator and an interface control that enables the third party operator to confirm the segment;

detecting, based on data received from the electronic device of the operator, interaction with the interface control that confirms the segment being provided by the operator according to the features of the segment;

creating the segment in response to detecting interaction with the interface control that confirms the segment, wherein creating the segment comprises selecting a given departure time for the segment that is within the given time period defined by the departure time window;

in response to creating the segment, enabling the clients of the segment provider to claim spots on the segment;

determining that at least one spot on the segment has been claimed by one or more of the clients of the segment provider; and in response to determining that the at least one spot on the segment has been claimed, scheduling the segment and preventing changes to the features of the segment.

10. The method of claim 9, wherein calculating, based at least on the features of the segment, a distribution output for the operator for operating the segment comprises:

determining an hourly rate for the segment based on a duration of time between a current time at which data specifying the features of the segment is received and the departure date;

determining, based on the departure code and the destination code, a segment duration for the segment;

identifying a number of spots on the segment; and determining the distribution based on a combination of the hourly rate, the segment duration, and the number of spots on the segment.

11. The method of claim 9, further comprising triggering navigation of the jet to a geographic location corresponding to the departure code or the destination code.

12. The method of claim 9, further comprising:

detecting, based on data received from the electronic device, interaction with an interface control that holds the distribution output constant for a specified time period; and keeping the distribution output constant for the specified time period.

13. The method of claim 9, wherein enabling the clients of the segment provider to claim spots on the segment comprises:

notifying multiple different clients that the segment is available; and enabling the multiple different clients to claim remaining spots on the segment through a client-side application.

14. The method of claim 13, further comprising calculating a required submission for each spot based on the distribution output, wherein notifying the multiple different clients comprising providing data specifying the determined required submission for each spot.

15. The method of claim 13, further comprising:

receiving, from a client, a request to claim a spot on the segment; and reserving a spot on the segment for the client.

16. A non-transitory computer storage medium encoded with a computer program, the program comprising instructions that when executed by data processing apparatus cause the data processing apparatus to perform operations comprising:

providing, to an electronic device of a third party operator, an interface that enables the operator to provide features of a segment that the operator is willing to operate for a segment provider that provides segments for clients;

receiving, from the electronic device, data specifying the features of the segment;

determining that the features of the segment include a departure code, a destination code, a departure date, a jet for the segment, and a departure time window defining a given time period in which the third party operator is willing to operate the jet for the segment;

calculating, based at least on the features of the segment, a distribution output that the segment provider will provide to the operator for operating the segment and making the segment available for the clients of the segment provider;

updating the interface to present the distribution output to the third party operator and an interface control that enables the third party operator to confirm the segment;

detecting, based on data received from the electronic device of the operator, interaction with the interface control that confirms the segment being provided by the operator according to the features of the segment;

creating the segment in response to detecting interaction with the interface control that confirms the segment, wherein creating the segment comprises selecting a given departure time for the segment that is within the given time period defined by the departure time window;

in response to creating the segment, enabling the clients of the segment provider to claim spots on the segment;

determining that at least one spot on the segment has been claimed by one or more of the clients of the segment provider; and in response to determining that the at least one spot on the segment has been claimed, scheduling the segment and preventing changes to the features of the segment.

17. The non-transitory computer storage medium of claim 16, wherein calculating, based at least on the features of the segment, a distribution output for the operator for operating the segment comprises:

determining an hourly rate for the segment based on a duration of time between a current time at which data specifying the features of the segment is received and the departure date;

determining, based on the departure code and the destination code, a segment duration for the segment;

identifying a number of spots on the segment; and determining the distribution based on a combination of the hourly rate, the segment duration, and the number of spots on the segment.

18. The non-transitory computer storage medium of claim 16, wherein the operations comprise triggering navigation of the jet to a geographic location corresponding to the departure code or the destination code.

* * * * *